Patented June 11, 1940

2,204,371

UNITED STATES PATENT OFFICE 2,204,371

PROCESS FOR THE PRODUCTION OF N-SUBSTITUTED FORMAMIDES

Donald J. Loder, Wilmington, Del., assignor to E. I. du Pont de Nemours & Company, Wilmington, Del., a corporation of Delaware No Drawing. Application July 22, 1937, Serial No. 155,005

17 Claims. (Cl. 260—561)

This invention relates to catalytic processes involving interaction of an alcohol, carbon monoxide, and ammonia and, more particularly, the production of substituted formamides.

It is an object of this invention to provide a new and improved process for the production of substituted formamides. Other objects and advantages will be apparent from the following specification in which the preferred embodiments and details of this invention are described.

It has been previously proposed to produce formamide catalytically by reaction of carbon monoxide and ammonia, in the presence of an alcohol, specifically methanol. In this process, relatively low temperatures and pressures have been utilized and the alcohol has been present as a solvent for the catalyst, such as sodium methylate, and has taken no apparent part in the reaction.

I have discovered, however, that by utilizing elevated temperatures and pressures substituted formamides may be catalytically produced by a reaction in which the alcohol, rather than acting only as a solvent or carrier for the catalyst, actually is one of the constituents taking part in the reaction. According to the present invention, therefore, substituted formamides are readily produced by causing the appropriate alcohol, ammonia, and carbon monoxide to react, in a closed vessel, at elevated temperatures and pressures and in the presence of a catalyst. The reaction may be represented as following the following equations:

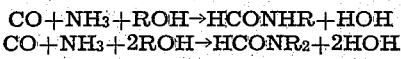

wherein R may be an alkyl, aryl or aralkyl group.

Although the process of this invention may be carried out in a batch operation with good yields of substituted formamides, it is also adaptable to a cyclic process which, in general, is often preferable and commercially more desirable. Accordingly the invention may be practiced as a cyclic process in which the substituted formamide is removed from the reaction products and the unconverted reactants are recycled to the reaction vessel for further reaction, together with make-up constituents which may be added if necessary. Accordingly, in the more detailed description of the present invention which follows, where I shall describe it in terms of a batch or a cyclic or continuous process, it will be understood that either type of process may be utilized as desired.

The reaction between an alcohol, ammonia, and carbon monoxide at elevated temperatures and pressures to yield substituted formamides is one favored by the use of a catalyst and, accordingly, I prefer to utilize a catalyst such as a salt of a strong base and weak acid, specifically alkali metal salts such as sodium or potassium formate or acetate, or equivalent salts of carbonic acid, boric acid or aliphatic fatty acids. Although separate introduction may be followed, the catalyst is, preferably, dissolved in the alcohol which is to undergo reaction and introduced into the reaction vessel dissolved in the alcohol. Liquid ammonia is then added and carbon monoxide forced into the reaction vessel until an elevated pressure in the range of, say, 300–1000 atmospheres is attained and thereafter maintained during the course of the reaction. Preferably, I utilize pressures in the more limited range of 400–900 atmospheres.

The temperatures utilized in practicing the present invention are maintained from about 150 to about 350° C., although preferably, in the preparation of mono- and dimethyl formamide or monoethanol formamide, I utilize temperatures of about 230–260° C.

In the production of substituted formamides according to the present invention, any alcohol may be employed whether mono- or polyhydric, of the aliphatic, aromatic, or alicyclic series, and the operating conditions, although varying somewhat with the alcohol utilized, are nevertheless quite similar, and the operating technique in the case of any alcohol is approximately the same as described in the examples which hereinafter appear.

The proportions of alcohol and ammonia, according to this invention, may be varied over a fairly wide range as long as elevated temperatures and pressures are employed. I have found, for example, that liquid ammonia and the alcohol may be employed varying from 0.1 mol of ammonia per mol of alcohol up to 10 mols of ammonia per mol of alcohol.

In like manner, the quantity of catalyst used may be varied within a wide range. Thus, based upon the alcohol employed, the catalyst concentration may be varied from about 0.01 mol to 0.25 mol per mol of alcohol.

In the production of substituted formamides involving the utilization of monohydric alcohols, the substituted formamide formed as a final product will be a mono- or di-alkyl formamide, such, for example, as mono- or dimethyl formamide when methanol is the alcohol employed; mono- or dipropyl formamide when propanol is the alcohol utilized; or mono- or di-isobutyl formamide when isobutanol is used. When polyhydric alcohols are caused to react with ammonia and carbon monoxide according to this invention, alkylol or aralkylol formamides will be produced, such, for example, as: ethanol formamide from ethylene glycol; propanol formamide from propylene glycol; glycerol formamide from glycerol; amide of N-formyl glycine from glycolic acid (also an alcohol);

benzyl formamide from benzyl alcohol, and the like. Similar results are obtained when other dihydric or trihydric alcohols are utilized, whether they be of the aliphatic, aromatic, or heterocyclic series, and, as indicated in the recitation of glycolic acid above, whether the alcohols are of the substituted variety or not.

The following examples, although not limiting, are illustrative of methods and constitutents which may be utilized according to the present invention.

*Example 1.*—A mixture of 326.4 grams of methanol, 85 grams of liquid ammonia, and 20 grams potassium acetate, dissolved in the methanol, was charged into a silver lined, high pressure autoclave furnished with a mechanical agitator. A pressure of 900 atmospheres of carbon monoxide was maintained on the charge which was heated with agitation for one and one-half hours at a temperature ranging from 243 to 260° C. Practically no methanol was recovered in the distillation of the final products so that the conversion and yield of methanol to monomethyl and dimethyl formamide was equal to the yield. This was equivalent to 18.6% of the theoretical yield of monomethyl formamide based on the equation—

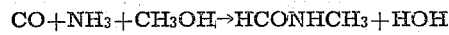

$$CO + NH_3 + CH_3OH \rightarrow HCONHCH_3 + HOH$$

and 42% of the theoretical amount of dimethyl formamide based on the equation—

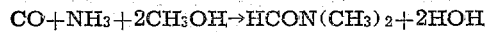

$$CO + NH_3 + 2CH_3OH \rightarrow HCON(CH_3)_2 + 2HOH$$

The conversion of ammonia charged on the basis of the above equations was 37.6% to monomethyl formamide and 42.8% to dimethyl formamide. The monomethyl and dimethyl formamides may be separated by distillation under reduced pressure.

*Example 2.*—A mixture of 316.8 grams of methanol, 89.1 grams of liquid ammonia and 20 grams potassium acetate, dissolved in the methanol, was charged into a silver lined, high pressure autoclave which was agitated by a mechanical rocker. A pressure of 900 atmospheres of carbon monoxide was maintained on the charge, throughout reaction, which was heated with agitation first at 210° C. for one-half hour, then at 245° C. for one hour. The weight of the product discharged was 532.4 grams. The exit gas from the autoclave was scrubbed with methanol to absorb unreacted ammonia and amines. The reaction product was fractionated in a fractionating column, while the amines and ammonia were absorbed in methanol.

The dimethyl formamide obtained in this reaction was separated along with the water produced. The methanolamines solutions from the absorbers with make-up methanol were combined with all the other products excepting water and dimethyl formamide and again returned to the autoclave, with make-up ammonia, for further reaction. It was found that a yield of 33.2% of dimethyl formamide, based on the methanol, was obtained. The products other than dimethyl formamide were recirculated for further reaction and a continuous process for dimethyl formamide was, thereby, obtained.

*Example 3.*—A mixture of 124 grams ethylene glycol, 34 grams of liquid ammonia, and 17 grams of potassium formate dissolved in the ethylene glycol, was charged into a silver lined high pressure autoclave furnished with a mechanical agitator. A pressure of 900 atmospheres of carbon monoxide was maintained on the charge which was heated, with agitation, at a temperature of 230° C., for two and one-half hours. At the end of this time the final products were removed from the autoclave and 34 grams of ethanol formamide separated therefrom by distillation, preferably at low pressure. There remained ethanolamine, glycol, water and formamide. In a cyclic process, the glycol and formamide are recirculated to the autoclave together with added ammonia, glycol and catalyst for further reaction to produce ethanol formamide.

Various changes may be made in the details of the present invention without sacrificing any of its advantages or departing therefrom.

I claim:

1. A process for the production of substituted formamides which comprises the steps of: (1) introducing into a pressure-resistant reaction vessel liquid ammonia, and an alcoholic body in the molecular ratio ranging from about 0.1 mol ammonia per mol alcoholic body to 10 mols ammonia per alcoholic body, in which is dissolved about 0.01 to 0.25 mol of an alkali metal salt of a fatty acid per mol of alcoholic body; (2) thereafter heating the resultant mixture for about 0.25 to 3 hours, during agitation, at a temperature in the range of 150° C. to 350° C., and under a pressure of 300 to 1000 atmospheres of carbon monoxide; and (3) thereafter separating the substituted formamide from the resultant product.

2. A process for the production of ethanol formamide which comprises reacting ethylene glycol, ammonia, and carbon monoxide at a temperature within the range of 150–350° C., and a pressure in the range of 300–1000 atmospheres in the presence of a catalyst comprising an alkali metal salt of a fatty acid.

3. A process for the production of dimethyl formamide which comprises reacting methanol, ammonia and carbon monoxide at a temperature within the range of 150–350° C., and a pressure in the range of 300–1000 atmospheres in the presence of a catalyst comprising an alkali metal salt of a weak acid.

4. A process for the production of ethanol formamide which comprises the steps of: (1) introducing into a pressure-resistant reaction vessel liquid ammonia and ethylene glycol in the molecular ratio of about 0.1–1.0 to 1.0–0.1, respectively, in which is dissolved about 0.01 to 0.25 mol of potassium acetate per mol of ethylene glycol; (2) thereafter heating the resultant mixture for about 0.5 to 3.0 hours, during agitation, at a temperature in the range of 150 to 350° C., and under a pressure of 300 to 1000 atmospheres of carbon monoxide; and (3) thereafter separating ethanol formamide from the resultant product.

5. A process for the production of monomethyl formamide which comprises the steps of: (1) introducing into a pressure-resistant reaction vessel liquid ammonia and methanol in the molecular ratio of about 0.1–1.0 to 1.0–0.1, respectively, in which is dissolved about 0.01 to 0.25 mol of potassium acetate per mol of methanol; (2) thereafter heating the resultant mixture for about 0.25 to 3.0 hours, during agitation, at a temperature in the range 150 to 350° C., and under a pressure of 300 to 1000 atmospheres of carbon monoxide; and, (3) thereafter separating dimethyl formamide from the resultant product.

6. A process for the production of dimethyl formamide which comprises: (1) introducing into a pressure-resistant reaction vessel liquid ammonia and methanol in the molecular ratio of about 0.1-1.0 to 1.0-0.1, respectively, in which is dissolved about 0.01 to 0.25 mol of potassium acetate per mol of methanol; (2) thereafter heating the resultant mixture for about 0.25 to 3.0 hours, during agitation, at a temperature in the range 150 to 350° C., and under a pressure of 300 to 1000 atmospheres of carbon monoxide; and, (3) thereafter separating dimethyl formamide from the resultant product.

7. A process for the production of ethanol formamide which comprises the steps of: (1) introducing into a pressure-resistant reaction vessel about 34 parts by weight of liquid ammonia, and about 124 parts of ethylene glycol in which is dissolved about 17 parts of potassium formate; (2) thereafter heating the resultant mixture, with agitation, for about two and one-half hours at a temperature of about 230° C., and under a pressure of about 900 atmospheres of carbon monoxide; and (3) thereafter separating the ethanol formamide from the resultant product.

8. A process for the production of dimethyl formamide which comprises the steps of: (1) introducing into a pressure-resistant reaction vessel about 85 parts by weight of liquid ammonia, and about 326 parts by weight of methanol in which is dissolved about 20 parts of potassium acetate; (2) thereafter heating the resultant mixture for about one and one-half hours, during agitation, at a temperature in the range of about 243 to about 260° C., and under a pressure of about 900 atmospheres of carbon monoxide; and (3) thereafter separating dimethyl formamide from the resultant product.

9. A process for the production of substituted formamides by reaction of an alcohol, ammonia, and carbon monoxide, in the presence of a catalyst comprising a salt of a weak acid and a strong base, substantially in accordance with the reaction:

$$CO + NH_3 + ROH \rightarrow HCONHR + HOH$$

wherein R represents a radical of the group consisting of alkyl and aralkyl radicals.

10. A process for the production of substituted formamides by reaction of an alcohol, ammonia and carbon monoxide, in the presence of a catalyst comprising a salt of a weak acid and a strong base, substantially in accordance with the reaction:

$$CO + NH_3 + 2ROH \rightarrow HCON(R)_2 + 2HOH$$

wherein R represents a radical selected from the group consisting of alkyl and aralkyl radicals.

11. A process for the production of substituted formamides by reaction of an alcohol, ammonia and carbon monoxide at a temperature within the range of 150 to 350° C., and a pressure in the range of 300 to 1000 atmospheres substantially in accordance with the reaction:

$$CO + NH_3 + ROH \rightarrow HCONHR + HOH$$

wherein R represents a radical of the group consisting of alkyl and aralkyl radicals.

12. A process for the production of substituted formamides by reaction of an alcohol, ammonia and carbon monoxide at a temperature within the range of 150 to 350° C., and a pressure in the range of 300 to 1000 atmospheres substantially in accordance with the reaction:

$$CO + NH_3 + 2ROH \rightarrow HCON(R)_2 + 2HOH$$

wherein R represents a radical selected from the group consisting of alkyl and aralkyl radicals.

13. A process for the production of substituted formamides which comprises reacting an alcohol, ammonia and carbon monoxide at a temperature within the range of 150 to 350° C., and a pressure in the range of 300 to 1000 atmospheres and in the presence of a catalyst comprising a salt of a weak acid and strong base, substantially in accordance with the reaction:

$$CO + NH_3 + ROH \rightarrow HCONHR + HOH$$

wherein R represents a radical of the group consisting of alkyl and aralkyl radicals.

14. A process for the production of substituted formamides which comprises reacting an alcohol, ammonia and carbon monoxide at a temperature within the range of 150 to 350° C., and a pressure in the range of 300 to 1000 atmospheres and in the presence of a potassium acetate catalyst comprising a salt of a weak acid and strong base, substantially in accordance with the reaction:

$$CO + NH_3 + ROH \rightarrow HCONHR + HOH$$

wherein R represents a radical of the group consisting of alkyl and aralkyl radicals.

15. A process for the production of substituted formamides which comprises reacting an alcohol, ammonia and carbon monoxide at a temperature within the range of 150 to 350° C., and a pressure in the range of 300 to 1000 atmospheres and in the presence of a catalyst comprising an alkali metal salt of a fatty acid and strong base, substantially in accordance with the reaction:

$$CO + NH_3 + ROH \rightarrow HCONHR + HOH$$

wherein R represents a radical of the group consisting of alkyl and aralkyl radicals.

16. A cyclic process for the production of substituted formamides which comprises reacting an alcohol, ammonia and carbon monoxide at a temperature within the range of 150 to 350° C., and a pressure in the range of 300 to 1000 atmospheres and in the presence of a catalyst comprising a salt of a weak acid and strong base, substantially in accordance with the reaction:

$$CO + NH_3 + ROH \rightarrow HCONHR + HOH$$

wherein R represents a radical of the group consisting of alkyl and aralkyl radicals, removing the resultant substituted formamide from the reaction products by distillation and submitting the unconverted reactants to further reaction together with added make-up constituents.

17. A cyclic process for the production of substituted formamides which comprises reacting an alcohol, ammonia and carbon monoxide at a temperature within the range of 150 to 350° C., and a pressure in the range of 300 to 1000 atmospheres and in the presence of a catalyst comprising a salt of a weak acid and strong base, substantially in accordance with the reaction:

$$CO + NH_3 + 2ROH \rightarrow HCON(R)_2 + 2HOH$$

wherein R represents a radical of the group consisting of alkyl and aralkyl radicals, removing the resultant substituted formamide from the reaction products by distillation and submitting the unconverted reactants to further reaction together with added make-up constituents.

DONALD J. LODER.